US010017614B2

(12) United States Patent
Yin et al.

(10) Patent No.: US 10,017,614 B2
(45) Date of Patent: Jul. 10, 2018

(54) EPOXY-RESIN COMPOSITION FOR FIBER-MATRIX SEMIFINISHED PRODUCTS

(71) Applicant: Reichhold AS, Sandfjord (NO)

(72) Inventors: Chunhong Yin, Ludwigshafen (DE); Achim Kaffee, Osnabrueck (DE); Michael Henningsen, Frankenthal (DE); Joachim Zwecker, Weinheim (DE); Lionel Gehringer, Schaffhouse-pres-Seltz (FR)

(73) Assignee: Reichhold AS, Sandfjord (NO)

( * ) Notice: Subject to any disclaimer, the term of this patent is extended or adjusted under 35 U.S.C. 154(b) by 133 days.

(21) Appl. No.: 14/890,836

(22) PCT Filed: May 5, 2014

(86) PCT No.: PCT/EP2014/059024
§ 371 (c)(1),
(2) Date: Nov. 12, 2015

(87) PCT Pub. No.: WO2014/184012
PCT Pub. Date: Nov. 20, 2014

(65) Prior Publication Data
US 2016/0115283 A1    Apr. 28, 2016

(30) Foreign Application Priority Data

May 13, 2013  (EP) .................................... 13167475

(51) Int. Cl.
| | |
|---|---|
| *B32B 27/38* | (2006.01) |
| *B32B 27/26* | (2006.01) |
| *B32B 27/04* | (2006.01) |
| *C08G 59/22* | (2006.01) |
| *C08G 59/40* | (2006.01) |
| *C08G 59/46* | (2006.01) |
| *C08L 63/00* | (2006.01) |
| *C08K 7/04* | (2006.01) |
| *C08K 7/14* | (2006.01) |
| *C08J 5/04* | (2006.01) |
| *C08G 59/50* | (2006.01) |
| *C08K 7/06* | (2006.01) |

(52) U.S. Cl.
CPC .......... *C08J 5/043* (2013.01); *C08G 59/4021* (2013.01); *C08G 59/5073* (2013.01); *C08J 5/042* (2013.01); *C08K 7/06* (2013.01); *C08K 7/14* (2013.01); *C08L 63/00* (2013.01); *C08J 2363/00* (2013.01)

(58) Field of Classification Search
None
See application file for complete search history.

(56) References Cited

U.S. PATENT DOCUMENTS

| | | | | |
|---|---|---|---|---|
| 4,826,991 A | * | 5/1989 | Sawa | .................... C07D 231/12 |
| | | | | 528/117 |
| 4,992,488 A | * | 2/1991 | Ruf | .......................... C08K 3/26 |
| | | | | 29/597 |
| 5,508,328 A | | 4/1996 | Olson | |
| 2008/0199717 A1 | | 8/2008 | Barker | |

FOREIGN PATENT DOCUMENTS

| | | | | | |
|---|---|---|---|---|---|
| CN | 101096443 A | * | 1/2008 | ............. | B29C 70/34 |
| CN | 102337007 B | | 4/2013 | | |
| ES | 2 303 769 B1 | | 7/2009 | | |

(Continued)

OTHER PUBLICATIONS

Machine translation of JP 55-165916 A (no date).*

(Continued)

*Primary Examiner* — Michael J Feely

(74) *Attorney, Agent, or Firm* — Neal, Gerber and Eisenberg LLP

(57) ABSTRACT

The present invention relates to an epoxy-resin composition as matrix component for sheet molding compounds (SMC) and/or bulk molding compounds (BMC), comprising a resin component comprising at least one epoxy resin and a hardener component comprising at least one imidazole compound and at least one latent hardener. In said epoxy-resin composition, the amount of the imidazole compounds used is in the range from 0.007 to 0.025 mol per mole of epoxy groups of the entire composition, and the total amount of primary amine groups optionally comprised does not exceed a proportion of 0.09 mol per mole of epoxy groups of the entire composition. The invention also relates to a fiber-matrix-semifinished-product composition (SMC composition or BMC composition) with, as matrix component, the epoxy-resin composition mentioned, and with, suspended therein, short reinforcement fibers with an average length of from 0.3 to 5.0 cm. The fiber-matrix-semifinished-product composition can be produced via mixing of the constituents, whereupon the composition thickens. The resultant thickened product (semisolid fiber-matrix semifinished product) features comparatively short maturing time and comparatively long available operating time. The invention also relates to the corresponding semisolid fiber-matrix composite, in particular to the semisolid SMC and to the corresponding cured fiber-matrix semifinished product, in particular the cured SMC. Finally, the invention also relates to a screening process for identifying epoxy-resin-based compositions which are suitable for use as thermoset matrix for producing SMC.

17 Claims, No Drawings

(56) References Cited

FOREIGN PATENT DOCUMENTS

| | | | |
|---|---|---|---|
| GB | 2462996 A | 3/2010 | |
| JP | 55-165916 A * | 12/1980 | ............ C08G 59/56 |
| JP | S62267318 | 11/1987 | |
| JP | 6-166742 A | 6/1994 | |
| JP | H0718061 | 1/1995 | |
| JP | 2005247879 | 9/2005 | |
| WO | WO 98/03588 A1 | 1/1998 | |
| WO | WO 98/22527 A1 | 5/1998 | |
| WO | WO 02/42235 A2 | 5/2002 | |

OTHER PUBLICATIONS

Machine translation of CN 101096443 A (no date).*
International Search Report dated Jul. 10, 2014 in PCT/EP2014/059024.
European Search Report dated May 12, 2014 in Patent Application No. 13 16 7475 (with English Translation of Category of Cited Documents).
"DIN EN 14598-3 Reinforced Thermosetting Moulding Compounds—Specification for Sheet Moulding Compound (SMC) and Bulk Moulding Compound (BMC)—Part 3: Specific Requirements; German version EN 14598-3:2005",DIN NORM, XP009177888, Jul. 2005, 23 pages.
Office Action for Japanese Patent Application No. 2016-513277 dated Jan. 22, 2018.
Stephan, et al., "In-Process Control of Epoxy Composite by Microdielectrometric Analysis," Polymer Engineering and Science, vol. 37, No. 2, 1997.

* cited by examiner

US 10,017,614 B2

EPOXY-RESIN COMPOSITION FOR FIBER-MATRIX SEMIFINISHED PRODUCTS

The present invention relates to an epoxy-resin composition comprising a resin component comprising at least one epoxy resin and a hardener component comprising at least one imidazole compound and at least one latent hardener, where the epoxy-resin composition is suitable as thermoset matrix for producing fiber-matrix semifinished product (resin mat (sheet molding compound (SMC)) or unshaped fiber-matrix semifinished product (bulk molding compound (BMC))), in particular SMC, without modification of the conventional processes for producing and using, by way of example, polyester-based fiber-matrix semifinished product. In said epoxy-resin composition, the amount of the imidazole compounds used is in the range from 0.007 to 0.025 mol per mole of epoxy groups of the entire composition. Another feature of said epoxy-resin composition is that the entire amount of primary amine groups optionally comprised does not exceed a proportion of 0.09 mol per mole of epoxy groups of the entire composition. The invention also relates to a fiber-matrix-semifinished-product composition, in particular an SMC composition, comprising the epoxy-resin composition mentioned and, suspended therein, short reinforcement fibers with an average length of from 0.3 to 5.0 cm. The fiber-matrix-semifinished-product composition can be produced via mixing of the constituents, whereupon the composition thickens (precuring). The resultant thickened product (semisolid (precured) fiber-matrix semifinished product, in particular semisolid (precured) SMC can be stored for some days or weeks. It can then be hardened under suitable curing conditions to give the cured fiber-matrix semifinished product (in particular cured SMC). The invention also relates to semisolid fiber-matrix semifinished product, in particular semisolid (precured) SMC and cured fiber-matrix semifinished product, in particular cured SMC. Finally, the invention also relates to a screening process for identifying epoxy-resin-based compositions which are suitable for use as thermoset matrix for producing SMC.

The use of SMC-based molding processes has expanded greatly during the course of recent years, in particular in the automobile industry (shock absorbers, trunk lids, etc.) and also in the electrical industry (cast parts, low-voltage applications, etc.). The resins most frequently used in this technology are unsaturated polyester resins. These resins are crosslinked by use of a reactive monomer, usually a vinyl monomer, and in particular styrene monomer.

In the conventional process, a solution made of unsaturated, carboxy-terminated polyester in the vinyl monomer (e.g. styrene) is mixed with a peroxide or another initiator, a thickener, such as magnesium oxide, and a filler, such as calcium carbonate or alumina. This liquid mixture is then mixed by way of example with sections of glass fiber or of other fiber between two foils (by way of example made of polyethylene or polyamide), and squeeze rollers are used here to remove air bubbles. The viscosity rises over a few days from an initial value that is usually from 0.01 to 100 Pa*sec to a value that is usually in the range from 30 000 to 150 000 Pa*sec. The viscosity increase is brought about via the reaction of the terminal carboxy groups of the polyester with the thickener. In the case of magnesium oxide as thickener, polymeric magnesium carbonates are formed. Once the thickener has been consumed, the viscosity reaches a plateau. This semisolid polyester-based SMC composition then has a non-tacky, leather-like consistency which is suitable for insertion into a compression mold. The viscosity of the thickened product should remain approximately constant over a period that is preferably at least three months, which is the available processing time for said polyester-based SMC composition.

If the viscosity is too low, liquid resin escapes from the mold during the shaping process. If, in contrast, the viscosity is too high, the SMC becomes board-like, and is therefore difficult to insert into the mold and may lack the flowability necessary for complete filling of the mold. The thickened polyester-based SMC composition is then cured via polymerization of the unsaturated bonds initiated by the peroxides, typically within from 2 to 10 min at temperatures of from 120 to 180° C.

A disadvantage of the known polyester-based SMC compositions described above is the use of styrene as reactive diluent. Styrene can escape from the aged thickened polyester-based SMC compositions and therefore represents a health risk, especially since it is now classified as a substance that is relatively hazardous to health. It has previously been proposed that styrene be replaced by isocyanates, but these are only slightly less hazardous to health than styrene, and they are therefore not an ideal solution to the problem.

Another problem with known polyester-based SMC is that the parts produced therefrom are very susceptible to warpage. In order to counteract this, thermoplastic additives are usually added (e.g. PS or PVA). However, these additives have a disadvantageous effect on viscosity and mechanical properties.

WO 98/22527 A1 describes epoxy-resin-based SMC compositions comprising an epoxy resin, a carboxylic acid or an anhydride thereof as thickener, a latent hardener, and optionally a catalyst for the curing reaction. The compositions described in that document have the disadvantage of comparatively long maturing time, in particular for further processing where the composition is compressed and hardened in a mold.

GB 2462996 A1 discloses epoxy-resin matrices for producing prepregs which include an epoxy resin, another resin material, an amine as thickener (B-staging), a latent hardener, and a catalyst or accelerator for the curing process. The composition described in that document has the disadvantage of the comparatively short time, from mixing of the constituents, during which the composition retains a consistency that is adequately flexible to permit easy handling.

CN 102337007 B discloses epoxy-resin-based SMC based on alkaline earth metal oxides, alkaline earth metal hydroxides, isocyanate compounds, or alcohols as thickeners.

ES 2303769 B discloses compositions made of epoxy resin, chain extender, latent hardener, curing accelerator, and additive, in particular for producing prepregs, where particular chain extenders mentioned are amines, amine adducts, polycarboxylic acids, polycarboxylic anhydrides, disulfides, thiols, polythiols, polysulfides, polyphenols, polyamines, and polyamides.

It would be desirable to provide an epoxy-resin-based SMC composition or epoxy-resin-based BMC composition which, as rapidly as possible after production, achieves an adequately long available processing time within which the viscosity under curing conditions (for example curing temperature of 140° C.) becomes adequately low (adequate flowability for complete filling of the mold) but at the same time remains sufficiently high to prevent escape of the epoxy-resin matrix from the mold during the shaping process (in particular during processing under pressure, in particular a compression process), with no separation of reinforcement fibers and matrix. A further intention is that the epoxy-resin-based SMC composition or epoxy-resinbased BMC composition retain an adequately flexible consistency for as long as possible, in order to facilitate handling (for example storage of the SMC in the form of rolls; insertion of the SMC into the compression mold).

Accordingly, the present invention provides an epoxy-resin composition comprising a resin component (A) comprising at least one epoxy resin (A1) and a hardener component (B) comprising at least one imidazole compound (B1), and at least one latent hardener (B2), where the amount of the imidazole compounds (B1) used is in the range from 0.007 to 0.025 mol per mole of epoxy groups of the entire composition, and where the total amount of primary amine groups optionally comprised does not exceed a proportion of 0.09 mol per mole of epoxy groups of the entire composition.

The invention also provides a fiber-matrix-semifinished-product composition comprising an epoxy-resin composition (matrix component) comprising a resin component (A) which comprises at least one epoxy resin (A1), and a hardener component (B) which comprises at least one imidazole compound (B1) and at least one latent hardener (B2), and comprising short reinforcement fibers (C) with an average length of from 0.3 to 5.0 cm (fiber component) suspended in the epoxy-resin composition (matrix component), where the amount of the imidazole compounds (B1) used is in the range from 0.007 to 0.025 mol per mole of epoxy groups of the entire composition, and where the entire amount of primary amine groups optionally comprised exceed a proportion of 0.09 mol per mole of epoxy groups of the entire composition. For the purposes of the present invention, fiber-matrix-semifinished-product compositions are SMC compositions or BMC compositions, preferably SMC compositions, where the short reinforcement fibers (C) in the case of SMC compositions preferably have an average length of from 1.2 to 5.0 cm and in the case of BMC compositions preferably have an average length of from 0.3 to 2.5 cm. The proportion of the short reinforcement fibers (C) in the fiber-matrix-semifinished-product composition of the invention is usually at least 10% by weight, based on the entire fiber-matrix-semifinished-product composition.

Properties and nomenclature of SMC and BMC are controlled by the standard DIN EN 14598.

The epoxy resin (A1) of this invention usually has from 2 to 10, preferably from 2 to 6, very particularly preferably from 2 to 4, and in particular 2, epoxy groups. The epoxy groups in particular involve the glycidyl ether groups produced during the reaction of alcohol groups with epichlorohydrin. The epoxy resins can involve low-molecular-weight compounds which generally have an average molar mass (Mn) smaller than 1000 g/mol, or higher-molecular-weight compounds (polymers). These polymeric epoxy resins preferably have a degree of oligomerization of from 2 to 25, particularly preferably from 2 to 10, units. They can involve (cyclo)aliphatic compounds, or compounds having aromatic groups. In particular, the epoxy resins involve compounds having two aromatic or aliphatic 6-membered rings, or oligomers of these. Industrially important materials are epoxy resins obtainable via reaction of epichlorohydrin with compounds having at least two reactive H atoms, in particular with polyols. Particularly important materials are epoxy resins obtainable via reaction of epichlorohydrin with compounds comprising at least two, preferably two, hydroxy groups, and comprising two aromatic or aliphatic 6-membered rings. Examples that may be mentioned of these epoxy resins (A1) of the invention are in particular bisphenol A and bisphenol F, and also hydrogenated bisphenol A and bisphenol F—the corresponding epoxy resins being the diglycidyl ethers of bisphenol A or bisphenol F, or of hydrogenated bisphenol A or bisphenol F. It is usual to use bisphenol A diglycidyl ether (DGEBA) as epoxy resin (A1) in this invention. In the invention, the expressions bisphenol A diglycidyl ether (DEGBA) and bisphenol F diglycidyl ether (DGEBF) mean not only the corresponding monomers but also the corresponding oligomeric variants. The epoxy resin (A1) of the invention is preferably a diglycidyl ether of monomeric or oligomeric diol. The diol here is preferably one selected from the group consisting of bisphenol A or bisphenol F, or of hydrogenated bisphenol A or bisphenol F, and the degree of oligomerization of the oligomeric diol is preferably from 2 to 25, particularly preferably from 2 to 10, units. Other suitable epoxy resins (A1) of this invention are tetraglycidylmethylenedianiline (TGMDA) and triglycidylaminophenol, and mixtures thereof. It is also possible to use reaction products of epichlorohydrin with other phenols, e.g. with cresols or with phenol-aldehyde adducts, such as phenol-formaldehyde resins, in particular novolaks. Epoxy resins which do not derive from epichlorohydrin are also suitable. Examples of those that can be used are epoxy resins which comprise epoxy groups via reaction with glycidyl (meth)acrylate. In the invention it is preferable that epoxy resins (A1) or mixtures thereof used are liquid at room temperature (25° C.), in particular with a viscosity in the range from 8000 to 12 000 Pa*sec. The epoxy equivalent weight (EEW) gives the average mass of the epoxy resin in g per mole of epoxy group. It is preferable that the epoxy resin (A1) of the invention have an EEW in the range from 150 to 250, in particular from 170 to 200.

In one particular embodiment of the invention, a mixture of various epoxy resins is used as epoxy resin (A1). A preferred mixture is the combination of DGEBA and epoxy-novolak resins, preferably in a ratio by weight of from 50:80 to 50:20.

In one particular embodiment of the invention, an individual epoxy resin, such as DGEBA, is used as epoxy resin (A1).

It is preferable that the epoxy-resin composition (matrix component without reinforcement fibers) of the invention is composed of at least 30% by weight, in particular at least 40% by weight, of epoxy resin (A1).

In one particular embodiment of the invention, the epoxy-resin composition or the fiber-matrix-semifinished-product composition comprises, as further constituent of the resin component (A) alongside the epoxy resin (A1), a reactive diluent (A2). For the purposes of the invention, reactive diluents (A2) are compounds which reduce the initial viscosity of the epoxy-resin composition or of the fiber-matrix-semifinished-product composition produced therefrom and during the course of curing of said composition enter into chemical bonding with the developing network made of epoxy resin and hardener. For the purposes of this invention, preferred reactive diluents (A2) are low-molecular-weight organic, preferably aliphatic compounds having one or more epoxy groups. Reactive diluents (A2) of the invention can also be cyclic carbonates, in particular cyclic carbonates having from 1 to 10 carbon atoms, for example ethylene carbonate, propylene carbonate, glycerol carbonate, butylene carbonate, or vinylene carbonate. Preferred reactive diluents (A2) of the invention are those selected from the group consisting of ethylene carbonate, vinylene carbonate, propylene carbonate, glycerol carbonate, 1,4-butanediol bisglycidyl ether, 1,6-hexanediol bisglycidyl ether, glycidyl neodecanoate, glycidyl versatate, 2-ethylhexyl glycidyl ether, neopentyl glycol diglycidyl ether, p-tert-butyl glycidyl ether, butyl glycidyl ether, C8-C10-alkyl glycidyl ether, C12-C14-alkyl glycidyl ether, nonylphenyl glycidyl ether, p-tert-butylphenyl glycidyl ether, phenyl glycidyl ether, o-cresyl glycidyl ether, polyoxypropylene glycol diglycidyl ether, trimethylolpropane triglycidyl ether, glycerol triglycidyl ether, triglycidylpara-aminophenol, divinylbenzyl dioxide, and dicyclopentadiene diepoxide. Particular preference is given to those selected from the group consisting of 1,4-butanediol bisglycidyl ether, 1,6-hexanediol bisglycidyl ether, 2-ethylhexyl glycidyl ether, C8-C10-alkyl glycidyl ether, C12-C14-alkyl glycidyl ether, neopentyl glycol diglycidyl ether, p-tert-butyl glycidyl ether, butyl glycidyl ether, nonylphenyl glycidyl ether, p-tert-butylphenyl glycidyl ether, phenyl glycidyl ether, o-cresyl glycidyl ether, trimethylolpropane triglycidyl ether, glycerol triglycidyl ether, divinylbenzyl dioxide, and dicyclopentadiene diepoxide. They are in particular those selected from the group consisting of 1,4-butanediol bisglycidyl ether, C8-C10-alkyl monoglycidyl ether, C12-C14-alkyl monoglycidyl ether, 1,6-hexanediol bisglycidyl ether, neopentyl glycol diglycidyl ether, trimethylolpropane triglycidyl ether, glycerol triglycidyl ether, divinylbenzene dioxide, and dicyclopentadiene diepoxide.

The reactive diluents (A2) of the invention preferably make up a proportion of up to 30% by weight, particularly preferably up to 20% by weight, in particular from 1 to 10% by weight, based on the entire resin component (A) (epoxy resin (A1) and any reactive diluents (A2) used) of the epoxy-resin composition.

The imidazole compound (B1) of this invention is imidazole itself or a derivative thereof. It is preferable that the imidazole compound (B1) is an imidazole compound of the general formula I

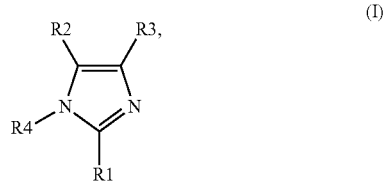

where
R1 is a hydrogen atom, an alkyl group, preferably having from 1 to 10 carbon atoms, an aryl group, preferably having from 3 to 16 carbon atoms, or an arylalkyl group, preferably having from 4 to 20 carbon atoms,
R2 and R3 are respectively mutually independently a hydrogen atom or an alkyl group, preferably having from 1 to 4 carbon atoms, and
R4 is a hydrogen atom, an alkyl group, preferably having from 1 to 4 carbon atoms, a benzyl group, or an aminoalkyl group, preferably having from 2 to 4 carbon atoms and having a primary amino group.

It is preferable that R1 of the imidazole compound of the general formula I is a hydrogen atom, an alkyl group having from 1 to 4 carbon atoms, an aryl group having from 3 to 7 carbon atoms, or an arylalkyl group having from 4 to 10 carbon atoms. It is particularly preferable that R1 is a hydrogen atom or an alkyl group having from 1 to 4 carbon atoms.

In one particular embodiment of the invention, R4 of the imidazole compound of the general formula I is a hydrogen atom, an alkyl group having from 1 to 4 carbon atoms, or a benzyl group. Examples of these imidazole compounds are imidazole, 1-methylimidazole, 1-ethylimidazole, 2-methylimidazole, 2-ethylimidazole, 2-undecylimidazole, 2-heptadecylimidazole, 2-phenylimidazole, 1,2-dimethylimidazole, 2-ethyl-4-methylimidazole, 2-phenyl-4-methylimidazole, 1-benzyl-2-phenylimidazole, 1-benzyl-2-methylimidazole.

In one particular embodiment of the invention, the imidazole compound of the formula I is an aminoalkylimidazole where R4 is an aminoalkyl group, preferably having from 2 to 4 carbon atoms and having a primary amino group. Examples of these aminoalkylimidazoles are 1-(2-aminoethyl)-2-methylimidazole, 1-(2-aminoethyl)-2-ethylimidazole, 1-(3-aminopropyl)imidazole, 1-(3-aminopropyl)-2-methylimidazole, 1-(3-aminopropyl)-2-ethylimidazole, 1-(3-aminopropyl)-2-phenylimidazole, 1-(3-aminopropyl)-2-heptadecylimidazole, 1-(3-aminopropyl)-2,4-dimethylimidazole, 1-(3-aminopropyl)-2,5-dimethylimidazole, 1-(3-aminopropyl)-2-ethyl-4-methylimidazole, 1-(3-aminopropyl)-2-ethyl-5-methylimidazole, 1-(3-aminopropyl)-4-methyl-2-undecylimidazole, and 1-(3-aminopropyl)-5-methyl-2-undecylimidazole. Among these compounds, particular preference is given to 1-(3-aminopropyl)imidazole (API).

For the purposes of the invention, alkyl groups have from 1 to 20 carbon atoms. They can be linear, branched, or cyclic. They can be saturated or (poly)unsaturated. They are preferably saturated. They have no substituents having heteroatoms. Heteroatoms are all atoms other than C and H atoms.

For the purposes of the invention, aryl groups have from 3 to 20 carbon atoms. The aromatic ring system can comprise 1 or 2 heteroatoms, preferably nitrogen and/or oxygen, per ring. They have no substituents having heteroatoms. Heteroatoms are all atoms other than C and H atoms.

In the curable compositions of the invention (epoxy-resin composition and fiber-matrix-semifinished-product composition) the total amount of the one or more imidazole compounds (B1) used is in the range from 0.007 to 0.025 mol per mole of epoxy groups of the entire composition, preferably in the range from 0.010 to 0.020 mol per mole of epoxy groups of the entire composition.

Latent hardener (B2) used in the epoxy-resin composition of the invention can comprise any compound or mixture thereof that is known for this purpose, and that under ambient conditions (temperature of from 10 to 50° C. at atmospheric pressure) does not react significantly with the epoxy resin used, but which at elevated temperature (for example above 80° C., in particular above 120° C.) reacts to give crosslinking with the epoxy resin used. A reaction that is not significant between the latent hardener and the epoxy resin is a reaction which within 24 h under ambient conditions leads at most to doubling of the viscosity of the epoxy-resin composition (for example no, or less than two-fold, increase of the viscosity at room temperature (25° C.) within 24 h). Hardeners which react with the epoxy resin even at relatively low temperatures lead to products (semi-solid fiber-matrix semifinished product (semisolid SMC or BMC)) with inadequate shelf life. Desirable shelf lives are at least 5 days, preferably at least 2 weeks, in particular at least 1 month, very particularly preferably at least 2 months, at room temperature. In this context shelf life is the period that begins with production and within which the semisolid fiber-matrix semifinished product can still be used advantageously for the shaping (for example in a compression process) of cured SMC and, respectively, BMC.

For the purposes of the invention, suitable latent hardeners (B2) are by way of example quaternary phosphonium compounds, and also boron trifluoride-amine adducts, in particular corresponding adducts with tertiary aliphatic amines. Dicyandiamide (DICY), in particular in finely ground form, is particularly suitable as latent hardener (B2). It leads to curing of the epoxy resin system at elevated temperature once the material has melted, probably by virtue of reactive cleavage products. Examples of other suitable latent hardeners are aromatic amines, such as 4,4'- or 3,3'-diaminodiphenyl sulfone, guanidines, such as 1-o-tolyl-diguanide, modified polyamines such as Anchor-32014S (Anchor Chemical UK Ltd, Manchester), carboxylic hydrazides, such as adipic dihydrazide, isophthalic dihydrazide, or anthralinic hydrazide, triazine derivatives, such as benzoguanamine, and also melamine. Preferred latent hardener (B2) of the invention is DICY.

The amount used of latent hardener (B2) in the curable compositions of the invention (epoxy-resin composition and fiber-matrix-semifinished-product composition) is that sufficient for the effective curing of the semisolid fiber-matrix semifinished product, for example of the semisolid SMC. Effective curing is present by way of example when at least 90%, preferably at least 95%, in particular at least 98%, of the epoxy groups still remaining in the semisolid fiber-matrix semifinished product after the thickening process are reacted. It is usual to use from 0.4 to 1.2, preferably from 0.6 to 1.1, particularly preferably from 0.8 to 1.0, equivalents of the latent hardener or of the mixture of latent hardeners, based on the epoxy equivalents remaining after the thickening process. In the case of DICY as latent hardener (B2), it is usual to use from 0.05 to 0.30 mol of DICY, preferably from 0.10 to 0.25 mol of DICY, based on the number of (originally used) moles of epoxy group of the curable composition.

The imidazole compound (B1) brings about the thickening of the curable composition of the invention (epoxy-resin composition or fiber-matrix-semifinished-product composition) to give the semisolid fiber-matrix semifinished product, and at the same time it can also be used as catalyst for the curing brought about via the latent hardener (B2), in particular if DICY is used as latent hardener (B2).

The hardener component (B) of the curable compositions of the invention (epoxy-resin composition and fiber-matrix-semifinished-product composition) can also comprise, alongside the imidazole compound (B1) and the latent hardener (B2), other constituents (optional constituents of the hardener component (B)) which can react with the epoxy groups of the resin component or can initiate, accelerate, or catalyze reactions of said groups.

These optional constituents of the hardener component (B) involve by way of example amines, in particular primary amines. It is preferable to use, as optional constituent of the hardener component (B), monoamines or polyamines having one or more, in particular having one or two, primary amino groups. Examples of amines which can be used as optional constituent of the hardener component (B) are dimethyldicycan (DMDC), isophoronediamine (IPDA), diethylenetriamine (DETA), triethylenetetramine (TETA), 1,3-bis(aminomethyl)cyclohexane (1,3-BAC), bis(p-aminocyclohexyl)methane (PACM), methylenedianiline (for example 4,4'-methylenedianiline), polyetheramines, such as polyetheramine D230, polyaminoamides such as Versamid 140, diaminodiphenylmethane (DDM), diaminodiphenyl sulfone (DDS), 2,4-toluenediamine, 2,6-toluenediamine, 2,4-diamino-1-methylcyclohexane, 2,6-diamino-1-methylcyclohexane, 1,2-diaminocyclohexane, 2,4-diamino-3,5-diethyltoluene, 2,6-diamino-3,5-diethyltoluene, 1,2-diaminobenzene, 1,3-diaminobenzene, 1,4-diaminobenzene, diaminodiphenyl oxide, 3,3',5,5'-tetramethyl-4,4'-diaminobiphenyl, 3,3'-dimethyl-4,4'-diaminobiphenyl, 1,12-diaminododecane, 1,10-diaminodecane, 1,2-propanediamine, 1,3-propanediamine, 2,2'-oxybis(ethylamine), 3,3'-dimethyl-4,4'-diaminodicyclohexylmethane, 4-ethyl-4-methylamino-1-octylamine, ethylenediamine, hexamethylenediamine, a mixture of 4-methylcyclohexane-1,3-diamines and 2-methylcyclohexane-1,3-diamines (MDACH), menthenediamine, xylylenediamine, N-aminoethylpiperazine, neopentanediamine, norbornanediamine, octamethylenediamine, 4,8-diaminotricyclo[5.2.1.0]decane, trimethylhexamethylenediamine, and piperazine, and also arylmonoamines such as aniline, cycloaliphatic monoamines such as cyclohexylamine, and alkylmonoamines such as 1-propylamine.

If primary amines are a constituent of the epoxy-resin compositions of the invention or of the fiber-matrix-semifinished-product composition of the invention, they can contribute to thickening thereof, or to the thickening of the corresponding fiber-matrix-semifinished-product composition (to give the semisolid fiber-matrix semifinished product, for example to give the semisolid SMC). A decisive factor here is that the total amount of primary amine groups does not exceed a proportion of 0.09 mol per mole of epoxy groups of the entire composition, in order that the available operating time or available processing time achieved for the semisolid fiber-matrix semifinished product is adequate. In one particular embodiment of the invention, the amount of primary amines comprised in the epoxy-resin composition or the fiber-matrix-semifinished-product composition is such that the total amount of primary amine groups is in the range from 0.01 to 0.05 mol per mole of epoxy groups of the entire composition. In another particular embodiment of the invention, the epoxy-resin composition or the fiber-matrix-semifinished-product composition is in essence free from primary amines.

The optional constituents of the hardener component (B) involve by way of example catalysts and/or accelerators for the curing reaction. Examples of these catalysts and/or accelerators are urea derivatives (urones) such as 1,1-dimethyl-3-phenylurea (fenuron) or 3,3'-(4-methyl-1,3-phenylene)bis(1,1-dimethylurea), and tertiary amines such as triethanolamine, benzyldimethylamine, 2,4,6-tris(dimethylaminomethyl)phenol, or tetramethylguanidine.

In one particular embodiment of the invention, the curable composition (epoxy-resin composition or fiber-matrix-semifinished-product composition) is in essence free from vinyl monomers, in particular from styrene.

In one particular embodiment of the invention, the curable composition (epoxy-resin composition or fiber-matrix-semifinished-product composition) is in essence free from solvents. For the purposes of this invention, solvents are compounds which are liquid at room temperature and which are suitable for dissolving or for diluting or for suspending one or more constituents of the epoxy-resin composition of the invention, without reacting chemically with the constituents of the epoxy-resin composition. Solvents in this sense are by way of example water, diethyl ether, isopropyl alcohol, methyl ethyl ketone, ethyl acetate, and also hydrocarbons such as toluene or xylene, and chlorinated hydrocarbons such as dichloromethane or tetrachloromethane. A particular solvent in this sense is water.

In one particular embodiment of the invention, the curable composition (epoxy-resin composition or fiber-matrix-semifinished-product composition) is in essence free from carboxylic acids and from carboxylic anhydrides.

In one particular embodiment of the invention, the curable composition (epoxy-resin composition or fiber-matrix-semifinished-product composition) is in essence free from non-epoxy-based curable resins and from non-epoxy-based thermoplastic materials. Particular non-epoxy-based curable resins and thermoplastic materials are phenolic resins, polyether sulfones, polyvinylformaldehyde resins, and polyamides.

The expression "in essence free" means for the purposes of this invention a proportion ≤1% by weight, preferably ≤0.1% by weight, particularly preferably "below the detection threshold", based on the corresponding entire composition.

For the purposes of the present invention, short reinforcement fibers (C) are short fiber sections with an average length of from 0.3 to 5.0 cm. For the use in SMC, it is preferable to use fiber sections with an average length of from 1.2 to 5.0 cm, and for the use in BMC it is preferable to use fiber sections with an average length of from 0.3 to 2.5 cm. The fibers are usually made of glass or mineral wool, or else nylon fibers, aramid fibers, or carbon fibers can be used as reinforcement fibers of the invention. It is preferable that the reinforcement fibers (C) involve glass fiber sections and/or carbon fiber sections, and in particular the short reinforcement fibers (C) involve glass fiber sections. It is preferable that the average length of the short reinforcement fibers (C) has a standard deviation of at most 10%, preferably at most 5%, in particular at most 2%, of the average length.

The fiber-matrix semifinished-product composition of the invention usually comprises a proportion of from 10 to 75% by weight, preferably from 25 to 65% by weight, of reinforcement fibers (C), based on the entire fiber-matrix-semifinished-product composition.

The curable composition of the invention (epoxy-resin composition or fiber-matrix-semifinished-product composition) can also comprise other additions, for example fillers, diluents, pigments, dyes, release agents, tougheners, flow agents, wetting agents, antifoamers, or flame-retardant agents. It is usual to add a functional amount of these additions, i.e. by way of example in the case of a pigment, an amount which leads to the desired color of the composition.

Examples of suitable fillers are aluminum oxide, aluminum hydroxide, silicates, modified montmorillonite, calcium carbonate, or alumina. The amount usually used of fillers is from 0 to 200% by weight, based on the entire curable composition without filler.

For the production of SMC or BMC, the constituents of the fiber-matrix-semifinished-product composition are brought into contact with one another and mixed. In the case of SMC production, said mixture is applied in the manner of a sheet generally between two foils. After mixing of the constituents, thickening of the fiber-matrix-semifinished-product composition occurs at room temperature. This process is characterized by an increase in the glass transition temperature (Tg) and the viscosity of the material. The thickening of the material produces the semisolid fiber-matrix semifinished product (semisolid SMC or BMC).

It is important here that this semifinished product has the longest possible available handling time at room temperature, starting with the mixing of the constituents, i.e. the longest possible time in which it has a certain flexibility. In particular in the case of semisolid SMC, where this is usually stored in the form of rolls, it is important that the material can be taken from the roll (ease of unrolling) and converted (ease of fabrication) to the form (e.g. flat mats or sheets) needed for further processing (curing). If the material loses its flexibility during the course of the thickening process, handling becomes more difficult, but it can generally still be processed (compression process in a compression mold). For the purposes of the present invention, it has been found that adequate ease of handling or ease of unrolling is ensured for a period during which the corresponding epoxy-resin composition (without reinforcement fibers) by way of example does not exceed a glass transition temperature of 5° C. (available operating time). For the epoxy-resin composition of the fiber-matrix-semifinished-product composition of the invention, this condition is satisfied at room temperature for a period of at least 3 days, preferably of at least 5 days.

At the same time, it is important that the material progresses as rapidly as possible to the condition in which it can be further processed (hardened). The processing generally takes place via pressing of the material in a compression mold under elevated pressure (for example 100 bar) and at elevated temperature (for example 150° C.). Under these conditions, the viscosity of the semisolid fiber-matrix semifinished product initially falls, in such a way that the material can fill the compression mold uniformly and completely. At the same time, under these conditions, the latent hardener brings about the hardening of the material and thus causes its viscosity to rise again rapidly. It is important here that the viscosity of the material does not fall too greatly during said processing, since otherwise separation of resin matrix and reinforcement fibers, and escape of the material from the compression mold, can occur. For the purposes of the present invention, it has been found that processability (compression process on the semisolid fiber-matrix semifinished product) that is adequate in this respect is ensured from the point in time from which the viscosity of a specimen (amounting to about 2 g) of the corresponding epoxy-resin composition (without reinforcement fibers) rapidly heated (0.5° C./sec) to 140° C. is then never less than 1 Pa*sec, measured by way of example in a rheometer (for example Anton Paar MCR 301, FW3.30 viscometer (plate-on-plate configuration; diameter 25 mm; gap 1000 μm, oscillation, shear rate 100 Hz)). The time required by the composition up to said point in time at a certain temperature, calculated starting from the mixing of the constituents, is the maturing time. The maturing time for the epoxy-resin composition of the fiber-matrix-semifinished-product composition of the invention, at room temperature, is at most 14 days, preferably at most 10 days, particularly preferably at most 8 days, in particular at most 6 days.

The available operating time for a curable composition is ideally longer than its maturing time, thus permitting the compression process for the semisolid fiber-matrix semifinished product, in particular for the semisolid SMC, to follow its fabrication directly.

It is preferable that the curable compositions also exhibit the longest possible time available for processing. This time available begins with the conclusion of the maturing time and ends when the viscosity no longer falls sufficiently during processing (compression process) to ensure complete and uniform filling of the compression mold. For the purposes of the present invention, it has been found that processability that is adequate in this respect (compression process on the semi-solid, pre-cured fiber-matrix semifinished) product) is ensured as long as by way of example the viscosity of a specimen (amounting to about 2 g) of the appropriate epoxy-resin composition (without reinforcement fibers) rapidly heated (0.5° C./sec) to 140° C. remains below 1000 Pa*sec, measured in a rheometer (for example Anton Paar MCR 301, FW3.30 viscometer (plate-on-plate configuration; diameter 25 mm; gap 1000 μm, oscillation, shear rate 100 Hz)).

The glass transition temperature can be determined by means of differential calorimetry (DSC) in accordance with the standard DIN 53765.

The present invention also provides a process for producing a fiber-matrix-semifinished-product composition of the invention (SMC composition or BMC composition), in particular an SMC composition, comprising the mixing of the constituents of the fiber-matrix-semifinished-product composition of the invention at a temperature at which the epoxy resin (A1) used does not react significantly with the latent hardener (B2) used, preferably at a temperature of from 10 to 50° C. A reaction that is not significant between the latent hardener and the epoxy resin is a reaction which within 24 h under ambient conditions leads at most to doubling of the viscosity of the epoxy-resin composition (for example no, or less than two-fold, increase of the viscosity at room temperature (25° C.) within 24 h).

The present invention also provides a process for producing matured semisolid fiber-matrix semifinished product (matured semisolid SMC or BMC) comprising the provision of a fiber-matrix-semifinished-product composition of the invention (SMC composition or BMC composition) and the maturing of the composition at a temperature at which, for at least the duration of the maturing time, the epoxy resin (A1) used does not react significantly with the latent hardener (B2) used, preferably at a temperature of from 10 to 50° C. During the maturing of the fiber-matrix-semifinished-product composition to give the semisolid fiber-matrix semifinished product, the imidazole compound (B1) brings about thickening of the composition. A reaction that is not significant between the latent hardener and the epoxy resin is a reaction which within 24 h under ambient conditions leads at most to doubling of the viscosity of the epoxy-resin composition (for example no, or less than two-fold, increase of the viscosity at room temperature (25° C.) within 24 h). The maturing time is the period that starts with the provision of the fiber-matrix-semifinished-product composition and ends at the point in time from which the viscosity of a specimen of 2 g of the corresponding epoxy-resin composition rapidly heated at 0.5° C./sec to 140° C. is then never less than 1 Pa*sec (measured by way of example in a rheometer (for example Anton Paar MCR 301, FW3.30 viscometer (plate-on-plate configuration; diameter 25 mm; gap 1000 μm, oscillation, shear rate 100 Hz)).

The present invention in particular provides a process for producing matured semisolid SMC comprising the provision of a SMC composition of the invention, the molding of layers from said composition, and the maturing of the composition at a temperature at which, for at least the duration of the maturing time, the epoxy resin (A1) used does not react significantly with the latent hardener (B2) used, preferably at a temperature of from 10 to 50° C. A reaction that is not significant between the latent hardener and the epoxy resin is a reaction which within 24 h under ambient conditions leads at most to doubling of the viscosity of the epoxy-resin composition (for example no, or less than two-fold, increase of the viscosity at room temperature (25° C.) within 24 h). The maturing time is the period that starts with the provision of the fiber-matrix-semifinished-product composition and ends at the point in time from which the viscosity of a specimen of 2 g of the corresponding epoxy-resin composition rapidly heated at 0.5° C./sec to 140° C. is then never less than 1 Pa*sec (measured by way of example in a rheometer (for example Anton Paar MCR 301, FW3.30 viscometer (plate-on-plate configuration; diameter 25 mm; gap 1000 μm, oscillation, shear rate 100 Hz)). The epoxy-resin composition (matrix component) is usually mixed together with the short reinforcement fibers (C) between two foils (generally removable foils by way of example made of polyethylene or polyamide) and molded to give an SMC composition in the form of a layer. Squeeze rollers are usually used to remove air bubbles. The viscosity of the epoxy-resin composition (matrix component) at the start of the process of mixing with the short reinforcement fibers (C) is generally in the range from 5 to 50 Pa*sec, in order to improve the impregnation of the reinforcement fibers by the epoxy-resin composition (matrix component). It is preferable that shortly after production of the SMC composition in the form of a layer it has already achieved a viscosity sufficient to minimize any separation of the short reinforcement fibers (C) from the resin matrix (epoxy-resin composition).

The present invention also provides the matured semisolid fiber-matrix semifinished product produced, or which can be produced, via the provision of a fiber-matrix-semifinished-product composition of the invention (SMC composition or BMC composition) and the maturing of the composition at a temperature at which, for at least the duration of the maturing time, the epoxy resin (A1) used does not react significantly with the latent hardener (B2) used, preferably at a temperature of from 10 to 50° C. A reaction that is not significant between the latent hardener and the epoxy resin is a reaction which within 24 h under ambient conditions leads at most to doubling of the viscosity of the epoxy-resin composition (for example no, or less than two-fold, increase of the viscosity at room temperature (25° C.) within 24 h). The maturing time is the period that starts with the provision of the fiber-matrix-semifinished-product composition and ends at the point in time from which the viscosity of a specimen of 2 g of the corresponding epoxy-resin composition rapidly heated at 0.5° C./sec to 140° C. is then never less than 1 Pa*sec (measured by way of example in a rheometer (for example Anton Paar MCR 301, FW3.30 viscometer (plate-on-plate configuration; diameter 25 mm; gap 1000 μm, oscillation, shear rate 100 Hz)).

The present invention in particular also provides the matured semisolid SMC produced, or which can be produced, via the provision of an SMC composition of the invention, the molding of layers from said composition, and the maturing of the composition at a temperature at which, for at least the duration of the maturing time, the epoxy resin (A1) used does not react significantly with the latent hardener (B2) used, preferably at a temperature of from 10 to 50° C., where it is preferable that the epoxy resin composition (matrix component) is mixed together with the short reinforcement fibers (C) between two foils (generally removable foils, by way of example made of polyethylene or polyamide) and is molded to give an SMC composition in the form of a layer, and where the viscosity of the epoxy-resin composition (matrix component) at the start of the process of mixing with the short reinforcement fibers (C) is preferably in the range from 5 to 50 Pa*sec. A reaction that is not significant between the latent hardener and the epoxy resin is a reaction which within 24 h under ambient conditions leads at most to doubling of the viscosity of the epoxy-resin composition (for example no, or less than two-fold, increase of the viscosity at room temperature (25° C.) within 24 h). The maturing time is the period that starts with the provision of the fiber-matrix-semifinished-product composition and ends at the point in time from which the viscosity of a specimen of 2 g of the corresponding epoxy-resin composition rapidly heated at 0.5° C./sec to 140° C. is then never less than 1 Pa*sec (measured by way of example in a rheometer (for example Anton Paar MCR 301, FW3.30 viscometer (plate-on-plate configuration; diameter 25 mm; gap 1000 μm, oscillation, shear rate 100 Hz)).

The present invention also provides cured fiber-matrix semifinished product (cured SMC or BMC), in particular cured SMC, produced, or which can be produced, via curing of the semisolid fiber-matrix semifinished product or of the semisolid SMC. The curing is advantageously carried out at temperatures in the range from 90 to 200° C., preferably in the range from 110 to 180° C., in particular in the range from 130 to 170° C. The curing time depends on the latent hardener (B2) used and on the curing temperature selected. It should be selected in such a way that at least 95%, preferably at least 98%, of the epoxy groups remaining in the semisolid fiber-matrix semifinished product after the thickening process are reacted. The curing time is usually in the range from 1 to 120 min, preferably from 2 to 60 min, particularly preferably from 2 to 15 min, in particular from 2 to 5 min. The curing usually takes place via compression in a mold at a pressure of from 5 to 200 bar, in particular from 25 to 150 bar.

The present invention also provides the use of an epoxy-resin composition comprising a resin component (A) comprising at least one epoxy resin (A1) and a hardener component (B) comprising at least one imidazole compound (B1) and at least one latent hardener (B2) as matrix component for producing semisolid SMC or for producing cured SMC, where the amount of the imidazole compounds (B1) used is in the range from 0.007 to 0.025 mol per mole of epoxy groups of the entire composition, and where the total amount of primary amine groups optionally comprised does not exceed a proportion of 0.09 mol per mole of epoxy groups of the entire composition.

The present invention also provides the use of SMC composition of the invention for producing semisolid SMC or for producing cured SMC.

The present invention also provides a screening process for identifying epoxy-resin-based compositions which are suitable as matrix for epoxy-resin-based sheet molding compounds, comprising the following steps:
(a) mixing the constituents of the epoxy-resin-based composition to be tested, in order to provide said composition,
(b) measuring the glass transition temperature over the course of time during storage of the epoxy-resin-based composition at a certain storage temperature until a previously defined upper limiting value for the glass transition temperature is exceeded, and determining the period that starts at the provision of the epoxy-resin-based composition to be tested and ends when the limiting value is exceeded, and
(c) measuring the viscosity minimum over the course of time during the storage of the epoxy-resin-based composition at a certain storage temperature until a previously defined lower limiting value for the viscosity minimum is exceeded, and determining the period that starts at the provision of the epoxy-resin-based composition to be tested and ends when the limiting value is exceeded,
where the epoxy-resin-based composition to be tested comprises, as constituents, at least one epoxy resin, one thickener, and one latent hardener,
where the thickener is a reagent which at the storage temperature reacts with the epoxy groups of the epoxy resin with chain extension but by virtue of its reactivity or of the amount used does not lead to complete hardening of the epoxy resin within the storage time,
where the latent hardener is a reagent which at storage temperature does not react significantly with the epoxy resin,
where the viscosity minimum is the lowest viscosity value that the epoxy-resin-based composition to be tested reaches on rapid increase of temperature to a previously defined hardening temperature, before the viscosity rises again by virtue of the hardening brought about by the latent hardener in the epoxy-resin-based composition to be tested,
where the hardening temperature is a temperature at which the latent hardener leads to complete hardening of the epoxy-resin-based composition to be tested,
where a reaction that is not significant between the latent hardener and the epoxy resin is a reaction which within 24 h at storage temperature leads at most to doubling of the viscosity of the epoxy-resin-based composition to be tested,
where complete hardening is hardening where at least 90% of all of the epoxy groups of the epoxy-resin-based composition to be tested have reacted,
where a rapid increase of the temperature during measurement of the viscosity minimum is an increase where the temperature of the epoxy-resin-based composition to be tested is brought from the storage temperature to the hardening temperature at at least 0.1° C./sec,
where the storage temperature is a temperature in the range from 10 to 50° C. and the storage time is a period of at least 30 days, and
where the selection of the upper limiting value for the glass transition temperature is such that this value is in the range from −5 to +10° C., and the selection of the lower limiting value for the viscosity minimum is such that this value is in the range from 0.5 to 10 Pa*sec.

The time determined in step (b) starting from the provision of the epoxy-resin-based composition to be tested and ending when the upper limiting value for the glass transition temperature is exceeded is a measure of the period during which the SMC with the epoxy-resin-based composition to be tested as matrix is sufficiently flexible for a fabrication process (for example unrolling of the SMC from the storage roll and cutting of suitable pieces to size for compression in the mold). For the purposes of this requirement, an SMC based on the epoxy-resin-based composition to be tested is by way of example advantageous if the time determined in step (b) when the storage temperature is 25° C. and when the upper limiting value for the glass transition temperature is 5° C. reaches at least 3 days, preferably 5 days, in particular 7 days.

The time determined in step (c) starting from the provision of the epoxy-resin-based composition to be tested and ending when the lower limiting value for the viscosity minimum is exceeded is a measure of the period which the SMC with the epoxy-resin-based composition to be tested as matrix needs for the maturing process, so that it can be used for compression in a mold (without escape of the molding composition from the mold). For the purposes of this requirement, an SMC based on the epoxy-resin-based composition to be tested is by way of example advantageous if the time determined in step (c) when the storage temperature is 25° C., when the temperature rises to a hardening temperature of 140° C. at 0.5° C./sec, and when the lower limiting value for the viscosity minimum is 1 Pa*sec reaches at most 14 days, preferably 10 days, particularly preferably 8 days, in particular 6 days.

In one particular embodiment, the screening process also comprises a further step (d), namely the selection, for the use as matrix component in an SMC, of an epoxy-resin-based composition for which the time determined in step (b) reaches or exceeds a particular minimum value, and for which the time determined in step (c) does not exceed a particular maximum value. It is preferable that the minimum value determined for the time determined in step (b) is 3 days, preferably 5 days, in particular 7 days, preferably at a storage temperature of 25° C. It is preferable that the maximum value determined for the time determined in step (c) is 14 days, preferably 10 days, particularly preferably 8 days, in particular 6 days, preferably at a storage temperature of 25° C.

In the screening process of the invention the hardening temperature is preferably in the range from 90 to 200° C., in particular from 130 to 170° C., for example 140° C. The storage temperature is preferably in the range from 15 to 40° C., for example 25° C. The storage time is preferably at least 60 days, in particular at least 90 days. Complete hardening is preferably hardening where at least 95%, in particular at least 98%, of all of the epoxy groups of the epoxy-resin-based composition to be tested have reacted. The upper limiting value for the glass transition temperature is preferably in the range from 0 to 8° C., for example 5° C. The lower limiting value for the viscosity minimum is preferably in the range from 0.8 to 5 Pa*sec, for example 1 Pa*sec. The rapid temperature rise of the epoxy-resin-based composition to be tested from the storage temperature to the hardening temperature preferably takes place at at least 0.2° C./sec, for example at 0.5° C./sec. Examples of suitable thickeners for the screening process of the invention are imidazole and derivatives of imidazole, mono-, di-, and polyfunctional primary amines, at least difunctional secondary amines, carboxylic acids, carboxylic anhydrides, tertiary amines, Mannich bases, guanidines, and substituted guanidines, substituted urea compounds, guanamine derivatives, melamine resins, and ketimines. An example of a suitable latent hardener for the screening process of the invention is DICY.

In contrast to the known polyester-based fiber-matrix semifinished products, epoxy-resin-based fiber-matrix semifinished product does not require the vinyl monomers that create health problems, in particular styrene. When epoxy-based resins are compared with polyester-based resins they moreover feature particularly advantageous mechanical properties, heat resistance, and chemicals resistance.

EXAMPLES

Example 1

Production of Epoxy-Resin Compositions E1 to E11 (of the Invention) and C1 to C6 (for Comparison)

In each case, 10 kg of DEGBA (A 18-00, Leuna Harze GmbH, EEW=180 g/eq) were mixed together with different hardener components in a mixing apparatus at room temperature. Table 1 collates the constituents, and also the amounts of these, for the hardener components of the compositions E1 to E11 and C1 to C6.

TABLE 1

Composition of the hardener component for epoxy-resin compositions C1 to C6 and E1 to E11

|    | API   | 1-Et-I | 2Et-4-Me-I | PA    | IPDA  | DICY |
|----|-------|--------|------------|-------|-------|------|
| C1 | 0.05  |        |            |       |       | 0.14 |
| C2 |       | 0.005  |            |       |       | 0.14 |
| C3 |       |        | 0.016      | 0.1   |       | 0.14 |
| C4 |       |        | 0.005      | 0.016 |       | 0.14 |
| C5 |       |        | 0.05       | 0.016 |       | 0.14 |
| C6 |       |        | 0.027      |       | 0.094 | 0.35 |

TABLE 1-continued

Composition of the hardener component for epoxy-resin compositions C1 to C6 and E1 to E11

|     | API   | 1-Et-I | 2Et-4-Me-I | PA    | IPDA  | DICY |
|-----|-------|--------|------------|-------|-------|------|
| E1  | 0.014 |        |            |       |       | 0.14 |
| E2  | 0.014 |        |            |       |       | 0.2  |
| E3  | 0.02  |        |            |       |       | 0.14 |
| E4  | 0.01  |        |            |       |       | 0.14 |
| E5  |       | 0.02   |            |       |       | 0.14 |
| E6  |       |        | 0.02       |       |       | 0.14 |
| E7  |       |        | 0.023      | 0.03  |       | 0.14 |
| E8  |       | 0.016  |            | 0.016 |       | 0.14 |
| E9  |       |        | 0.016      | 0.009 |       | 0.14 |
| E10 |       |        | 0.009      |       | 0.014 | 0.14 |
| E11 |       |        | 0.018      |       | 0.023 | 0.14 |

API: N-(3-aminopropyl)imidazole; 1-Et-I: 1-ethylimidazole; 2-Et-4-Me-I: 2-ethyl-4-methyl-imidazole;
PA: 1-propylamine; IPDA: isophoronediamine; DICY: dicyandiamide; all quantitative data are mol per mole of epoxy group in the entire epoxy-resin composition Example 2

Measurement of Glass Transition Temperature and of Viscosity for the Epoxy-Resin Compositions E1 to E11 and C1 to C6 Over the Course of Time Differential calorimetry (DSC) was used in accordance with the standard DIN 53765 to measure the glass transition temperature for the epoxy-resin compositions E1 to E11 and C1 to C6 immediately after the mixing of the constituents of the respective epoxy-resin compositions, and then in each case once daily during the storage of the corresponding epoxy-resin compositions at 25° C. Table 2 collates the glass transition temperatures thus determined as a function of the storage time for the respective epoxy-resin compositions E1 to E11 and C1 to C6.

Immediately after the mixing of the constituents for the respective epoxy-resin compositions E1 to E11 and C1 to C6, and then in each case once daily during storage at 25° C., the minimum of the viscosity curve resulting from rapid heating of the specimen was determined. To this end, in each case a specimen (about 2 g) of the respective epoxy-resin composition was taken and heated at 0.5° C./sec from the storage temperature (25° C.) to the hardening temperature (140° C.), while viscosity was measured as a function of time. The viscosity was measured by using a rheometer (Anton Paar MCR 301, FW3.30 viscometer (plate-on-plate configuration; diameter 25 mm; gap 1000 μm, oscillation, shear rate 100 Hz)). The heating of the specimen initially reduces the viscosity, but then it rises rapidly over the further course of time because of the onset of latent curing. Table 3 collates the minimum of the viscosity curve here as a function of storage time for the respective epoxy-resin compositions E1 to E11 and C1 to C6.

TABLE 2

Glass transition temperature (in ° C.) over the course of time (from 0 to at most 14 days) for the epoxy-resin compositions E1 to E11 and C1 to C6

Storage time in days at 25° C.

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| C1 | −19 | −6 | 12 | 20 | | | | | | | | | | | |
| C2 | −16 | −15 | −13 | −13 | −14 | −13 | −12 | −11 | −10 | −9 | −8 | −8 | −8 | −5 | −5 |
| C3 | −18 | −5 | 1 | 12 | 16 | | | | | | | | | | |
| C4 | −16 | −14 | −14 | −14 | −13 | −11 | −10 | −9 | −8 | −8 | −7 | −8 | −2 | −3 | 0 |
| C5 | −20 | −13 | −1 | 19 | 23 | | | | | | | | | | |
| C6 | −23 | 15 | >50 | | | | | | | | | | | | |
| E1 | −16 | −14 | −11 | −9 | −7 | −2 | 3 | 7 | | | | | | | |
| E2 | −16 | −14 | −12 | −11 | −12 | −3 | 2 | 5 | 11 | | | | | | |
| E3 | −17 | −12 | −8 | −5 | 2 | 9 | 15 | | | | | | | | |
| E4 | −17 | −14 | −12 | −12 | −10 | −8 | −5 | 0 | 1 | 4 | 6 | | | | |
| E5 | −17 | −15 | −10 | −8 | −4 | 2 | 8 | 12 | | | | | | | |
| E6 | −16 | −15 | −13 | −12 | −10 | −8 | −1 | 4 | 8 | 14 | | | | | |
| E7 | −17 | −12 | −10 | −8 | −2 | 6 | 13 | | | | | | | | |
| E8 | −17 | −13 | −9 | −7 | −3 | 4 | 10 | 13 | 17 | | | | | | |
| E9 | −16 | −14 | −13 | −12 | −10 | −6 | −1 | 3 | 9 | 12 | | | | | |
| E10 | −15 | −12 | −12 | −11 | −11 | −9 | −7 | −5 | −3 | −2 | 0 | 4 | 7 | 11 | |
| E11 | −17 | −11 | −7 | −6 | −3 | 3 | 9 | 14 | | | | | | | |

TABLE 3

Viscosity minimum (in Pa*sec) over the course of time from 0 to at most 14 days for the epoxy-resin compositions E1 to E11 and C1 to C6

Storage time in days at 25° C.

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| C1 | 0.05 | 0.6 | >10 | | | | | | | | | | | | |
| C2 | 0.02 | 0.03 | 0.03 | 0.03 | 0.04 | 0.04 | 0.06 | 0.07 | 0.1 | 0.1 | 0.1 | 0.1 | 0.2 | 0.2 | 0.3 |
| C3 | 0.04 | 0.2 | 0.5 | 2 | >10 | | | | | | | | | | |
| C4 | 0.02 | 0.02 | 0.03 | 0.03 | 0.04 | 0.04 | 0.06 | 0.06 | 0.08 | 0.1 | 0.1 | 0.1 | 0.2 | 0.3 | 0.4 |
| C5 | 0.03 | 0.1 | 4 | >10 | | | | | | | | | | | |
| C6 | 0.09 | >10 | | | | | | | | | | | | | |
| E1 | 0.03 | 0.05 | 0.1 | 0.2 | 0.4 | 1 | 4 | >10 | | | | | | | |
| E2 | 0.04 | 0.06 | 0.1 | 0.2 | 0.5 | 1 | 2.5 | >10 | | | | | | | |
| E3 | 0.03 | 0.2 | 0.2 | 0.6 | 3 | >10 | | | | | | | | | |
| E4 | 0.03 | 0.05 | 0.06 | 0.07 | 0.2 | 0.2 | 0.4 | 0.6 | 1.5 | 5 | >10 | | | | |
| E5 | 0.03 | 0.05 | 0.1 | 0.2 | 0.3 | 1 | 5 | >10 | | | | | | | |
| E6 | 0.02 | 0.03 | 0.04 | 0.07 | 0.1 | 0.3 | 0.7 | 2.5 | 8 | >10 | | | | | |
| E7 | 0.03 | 0.05 | 0.1 | 0.2 | 1 | 3 | >10 | | | | | | | | |
| E8 | 0.03 | 0.06 | 0.1 | 0.2 | 0.4 | 1 | 4.55 | >10 | | | | | | | |
| E9 | 0.03 | 0.03 | 0.05 | 0.08 | 0.1 | 0.3 | 0.6 | 1.5 | >10 | | | | | | |
| E10 | 0.03 | 0.03 | 0.05 | 0.05 | 0.07 | 0.09 | 0.1 | 0.2 | 0.4 | 0.7 | 1.5 | 5 | >10 | | |
| E11 | 0.04 | 0.05 | 0.1 | 0.3 | 0.5 | 1.5 | 8 | >10 | | | | | | | |

Example 3

SMC Production (Based on the Composition E1)

10 kg of DEGBA (A 18-00, Leuna Harze GmbH, EEW=180 g/eq), 650 g of DICY (DYHARD® 100S, Alzchem) and 100 g of N-(3-aminopropyl)imidazole (Lupragen® API, BASF) were mixed together in a mixing apparatus. The paste (epoxy-resin composition E1) thus produced was transferred at room temperature to the storage vessels of the doctor system of a conventional SMC machine. Between two foils in the SMC machine, glass-fiber sections (P204, Owens Corning, with an average length of 2.5 cm; 60% by weight, based on the entire SMC composition) were added to the paste and thus impregnated. The resultant SMC was rolled up onto a roll and stored at room temperature for the thickening process. After 5 days, the SMC had a leather-like consistency. After unrolling, it was cut to size for the compression molding process. The SMC was then cured in a compression mold for 5 min at a temperature of 150° C. under a pressure of 100 bar. The mechanical properties of the cured material were determined. Table 4 collates standards for the test methods and the results of the measurements.

TABLE 4

Mechanical properties of a cured SMC (epoxy-resin composition E1 as matrix)

| Flexural properties (in accordance with DIN EN ISO 14125) | Flexural modulus [MPa] | 15 000 |
|---|---|---|
| | Flexural strength [MPa] | 400 |
| | Maximal flexural strain [%] | 3.5 |
| Tensile properties (in accordance with DIN EN ISO 527-4) | Modulus of elasticity [MPa] | 14 500 |
| | Tensile strength [MPa] | 230 |
| | Maximal tensile strain [%] | 2.2 |
| Charpy test (in accordance with ISO 179-2/1eU: 1997) | [kJ/m$^2$] | 130 |

The invention claimed is:
1. A fiber-matrix-semifinished-product composition comprising:
   an epoxy-resin composition comprising:
      a resin component comprising at least one epoxy resin, and
      a hardener component comprising at least one imidazole compound and at least one latent hardener, and
   short reinforcement fibers having an average length of 0.3 cm to 5.0 cm suspended in the epoxy-resin composition;
   wherein:
      the amount of the imidazole compound is 0.007 mol to 0.025 mol, per mole of epoxy groups of the fiber-matrix-semifinished-product composition, and
      the fiber-matrix-semifinished-product composition optionally comprises primary amines, the total amount of primary amine groups from the optional primary amines does not exceed a proportion of 0.09 mol per mole of epoxy groups of the fiber-matrix-semifinished-product composition.
2. The fiber-matrix-semifinished-product composition according to claim 1, wherein the short reinforcement fibers have an average length of 1.2 cm to 5.0 cm.
3. The fiber-matrix-semifinished-product composition according to claim 1, wherein the short reinforcement fibers make up at least 10% by weight of the fiber-matrix-semifinished-product composition, based on the total weight of the fiber-matrix-semifinished-product composition.
4. The fiber-matrix-semifinished-product composition according to claim 1, wherein the short reinforcement fibers are glass fibers, carbon fibers, or a mixture of both.
5. The fiber-matrix-semifinished-product composition according to claim 1, wherein the epoxy resin is a diglycidyl ether of monomeric or oligomeric diol, the diol being selected from the group consisting of bisphenol A, bisphenol F, and hydrogenated bisphenol A and hydrogenated bisphenol F.
6. The fiber-matrix-semifinished-product composition according to claim 1, wherein the resin component further comprises a reactive diluent.
7. The fiber-matrix-semifinished-product composition according to claim 1, wherein the imidazole compound is an imidazole compound of the general formula I:

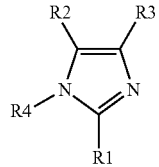

where:
R1 is a hydrogen atom, an alkyl group, an aryl group, or an arylalkyl group,
R2 and R3 are respectively mutually independently a hydrogen atom or an alkyl group, and
R4 is a hydrogen atom, an alkyl group, a benzyl group, or an aminoalkyl group.
8. The fiber-matrix-semifinished-product composition according to claim 7, where:
R1 is a hydrogen atom, an alkyl group comprising 1 to 4 carbon atoms, an aryl group comprising 3 to 7 carbon atoms, or an arylalkyl group comprising 4 to 10 carbon atoms,
R2 and R3 are respectively mutually independently a hydrogen atom or an alkyl group comprising 1 to 4 carbon atoms, and
R4 is a hydrogen atom, an alkyl group comprising 1 to 4 carbon atoms, a benzyl group, or an aminoalkyl group comprising 2 to 4 carbon atoms and a primary amino group.
9. The fiber-matrix-semifinished-product composition according to claim 7, where:
R4 is a hydrogen atom, an alkyl group comprising 1 to 4 carbon atoms, or a benzyl group.
10. The fiber-matrix-semifinished-product composition according to claim 7, where:
R4 is an aminoalkyl group comprising 2 to 4 carbon atoms and a primary amino group.
11. The fiber-matrix-semifinished-product composition according to claim 1, wherein the latent hardener is dicyandiamide.
12. A process for producing a fiber-matrix-semifinished-product composition, comprising:
mixing of the constituents of the fiber-matrix-semifinished-product composition according to claim 1 at a temperature at which the epoxy resin does not react significantly with the latent hardener.
13. A process for producing a matured semisolid fiber-matrix semifinished product comprising the provision of a fiber-matrix-semifinished-product composition according to claim 1, comprising:
maturing the fiber-matrix-semifinished-product composition at a temperature at which, for at least the duration of a maturing time, the epoxy resin does not react significantly with the latent hardener;
wherein the maturing time is the period that starts with the provision of the fiber-matrix-semifinished-product composition and ends at the point in time, from which the viscosity of a specimen of 2 g of the corresponding epoxy-resin composition rapidly heated at 0.5° C./sec to 140° C. is never less than 1 Pa*sec.
14. A matured semisolid fiber-matrix semifinished product, produced by the process according to claim 13.
15. A cured fiber-matrix semifinished product, produced via curing of the semisolid fiber-matrix semifinished product according to claim 14.
16. A method for producing a semisolid sheet molding compound or a cured sheet molding compound, comprising:
maturing the fiber-matrix-semifinished-product composition according to claim 1.
17. The fiber-matrix-semifinished-product composition to claim 1, being in essence free of primary amines.

* * * * *